(12) United States Patent
Merton

(10) Patent No.: US 9,122,281 B1
(45) Date of Patent: Sep. 1, 2015

(54) SIMPLIFIED METHOD AND DEVICE FOR SENSING WATER LEVEL IN A RESERVOIR

(76) Inventor: Hollye Merton, Gainsville, FL (US)

( * ) Notice: Subject to any disclaimer, the term of this patent is extended or adjusted under 35 U.S.C. 154(b) by 752 days.

(21) Appl. No.: 13/492,958

(22) Filed: Jun. 11, 2012

Related U.S. Application Data

(60) Provisional application No. 61/498,203, filed on Jun. 17, 2011.

(51) Int. Cl.
*H01H 35/00* (2006.01)
*G05D 9/12* (2006.01)

(52) U.S. Cl.
CPC ......................................... *G05D 9/12* (2013.01)

(58) Field of Classification Search
USPC .......................................................... 307/118
See application file for complete search history.

(56) References Cited

U.S. PATENT DOCUMENTS

2009/0187314 A1* 7/2009 Kitamura et al. ............... 701/45

* cited by examiner

*Primary Examiner* — Rexford Barnie
*Assistant Examiner* — Dru Parries
(74) *Attorney, Agent, or Firm* — Sven W. Hanson

(57) ABSTRACT

A simplified method and device for sensing water level is disclosed. In particular applications the invention may be used for activating a fill valve or other control circuitry in order to maintain an average level in a reservoir or provide notification of a low fluid level. By incorporating a standard rectifier circuit as a biasing network for a solid-state circuit control driver on one side of a probe network, the level of the water may be determined when contact is made with the probes. AC current drawn across metallic probes provides a DC bias at the output of the rectifier that may be incorporated into various control circuits.

4 Claims, 2 Drawing Sheets

SIMPLIFIED METHOD AND DEVICE FOR SENSING WATER LEVEL IN A RESERVOIR

BACKGROUND OF THE INVENTION

The present invention pertains to devices and methods for maintaining water level in a reservoir. Sensing water level in reservoirs of varying styles and application has been an important need in many industries. The need to ensure that a fluid remains at a set level within these reservoirs makes it necessary to economically sense when the level has dropped below the prescribed setting and provide a means to activate a filling mechanism to return the fluid to its proper level or activate an alarm or other control functions.

There are many methods in the prior art for sensing level, yet many are expensive and difficult to apply. Probes of varying shapes and size have predominantly been used as a means to sense water level because of their simplicity of manufacture and relative ease of use. However, the circuitry needed to integrate the probes to provide control capabilities can become intricate and expensive.

As direct current (DC) causes corrosive breakdown of the probe material due to electrolysis, alternating current is typically used to minimize the effects of electrolysis.

With this in mind, prior art devices have incorporated the aforementioned probes in conjunction with expensive current sensing devices that use magnetic field sensing, optics, logic matrices, or capacitance networks to induce a secondary indicator signal to activate the control circuitry. What is needed is a simple and inexpensive device to sense water levels and enable control of water flow devices using direct current electrical power.

SUMMARY OF THE INVENTION

In the present invention, two electrical probes are spatially separated to be electrically insulated by intervening air gap when located in ambient air. When a voltage potential is provided across the probes when submerged in a conducting liquid, a current passing between them is used to create a control voltage in control circuit. The control circuit may then be used to operate or control any of a variety of conventional devices such as for water flow control. The inventive device may be incorporated into a portable water sensing device or may be integrated into as a component of a fixed facility.

In one configuration of the inventive device, low-voltage alternating current (AC) is sent via the probes to a shunted full-wave bridge rectifier which then provides a reference DC voltage output dependent on whether the probes are shorted, electrically open, or at some other state of conductance. This DC output is used as a signal applied to a solid-state control driver, which is used to delivery DC power to activate fill, sump, alarm or other water flow control devices or systems.

The present invention provides a method for sensing change in sensing probe current using common components thereby reducing cost dramatically and simplifying sensing mechanisms. The overall purpose of the invention is to provide a means to economically sense water level in a reservoir and provide a method for incorporating a control interface to allow water flow control components to act upon the state of the water level in the reservoir.

Additional novel aspects and benefits of the invention will be discerned from the following description of particular embodiments and the accompanying figures.

DETAILED DESCRIPTION OF EMBODIMENTS OF THE INVENTION

Figure 1:
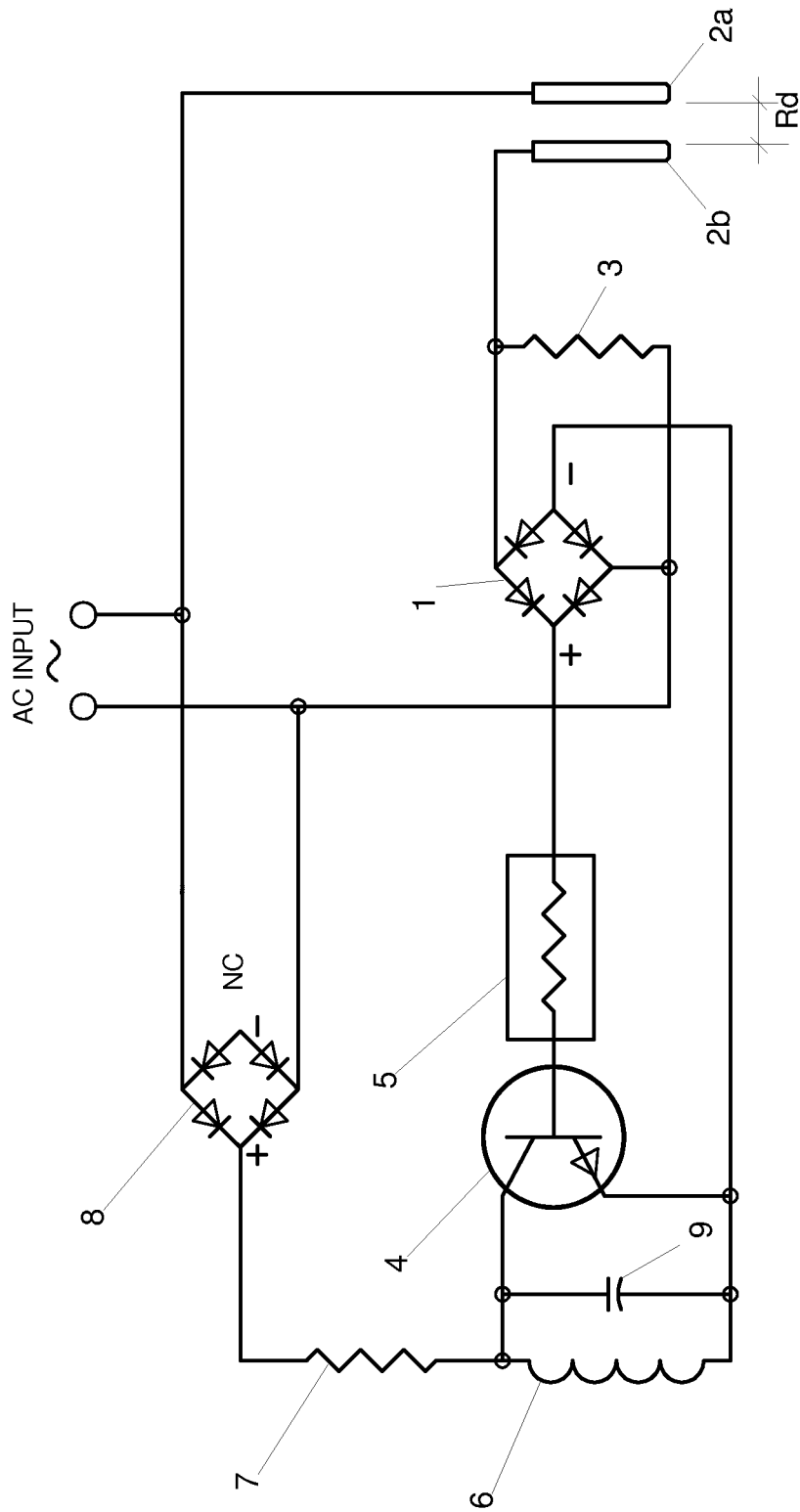
FIG. 1 is a schematic representation of the invention.
Figure 2:
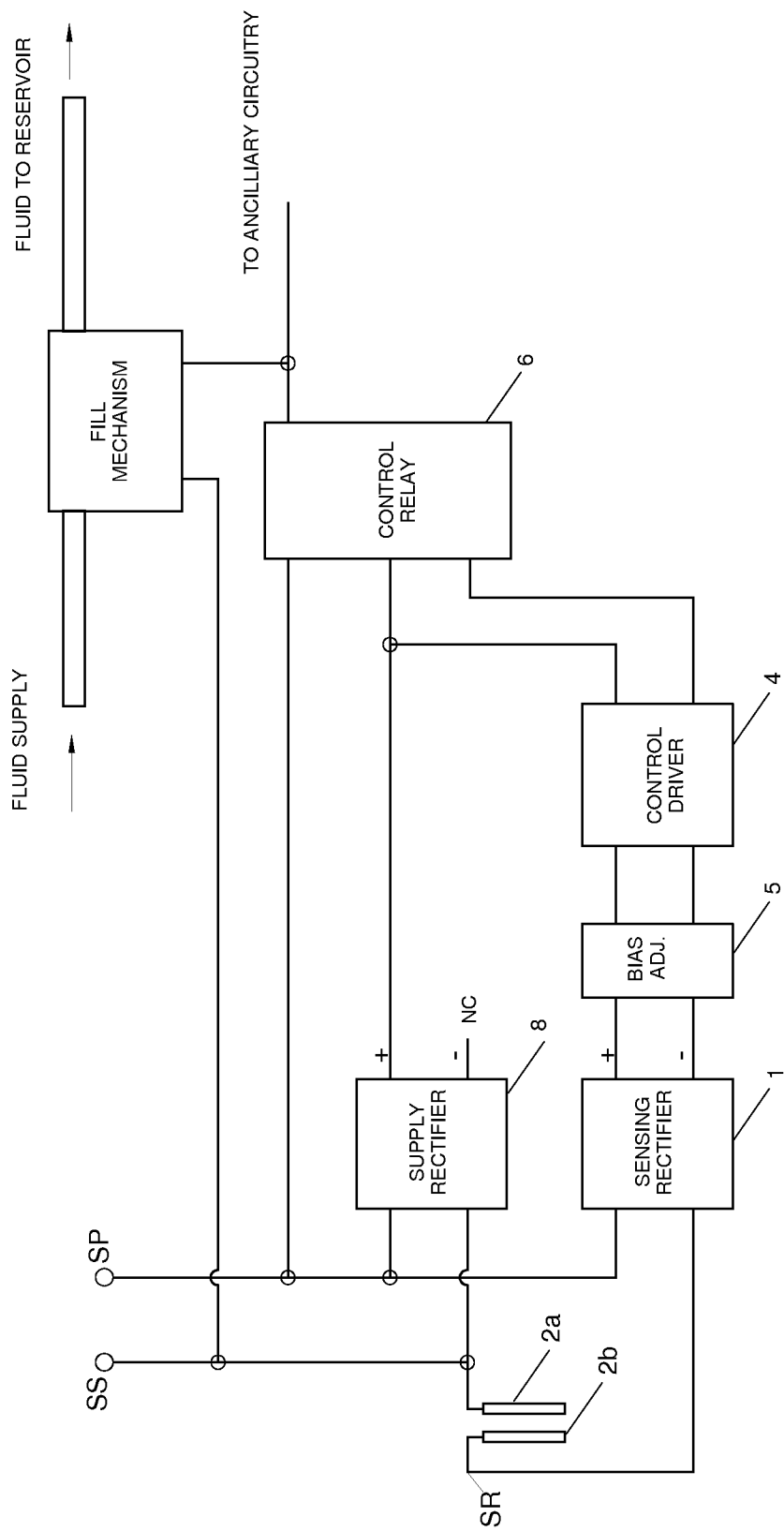
FIG. 2 is a functional block diagram of the invention used in a preferred embodiment.

FIGS. 1 and 2 illustrate embodiments of the invention. The following discussion regards the elements of both figures. Two conductive probes 2a, 2b are held in fixed geometry with an intervening gap such that when surrounded by ambient air, the probes are effectively electrically open.

It will be clear from their requirements here that the probes may be formed of any of various conductive materials including metals. Most preferably, the probes are formed of materials having a low propensity to corrode in a wet environment. The size of the probes and their gap may vary in particular applications depending at least on the nature of the supplied electrical power. In applications using configurations similar to those of the embodiments described herein, probes may have a ⅛ inch (3.2 millimeter) diameter and exposed length of ⅜ inch (9.5 millimeter). The exposed length of the probes may be partially covered by physically supporting structure.

In the configuration illustrated in FIG. 1, one phase of a low-voltage AC electrical power supply (Supply Phase) SP is connected to a standard full-wave rectifier bridge referred to here as a sensing bridge 1. A sense send phase SS is connected to the first (cathode) probe, 2a. The other probe, 2b (the anode) is connected to the return phase SR on the sensing bridge 1. A shunt resister 3 is connected in parallel between phases SS, SP to provide a discharge path for the capacitance of the probe cable, as well as to limit current for the input of the sensing bridge 1.

The resultant rectified DC voltage Vc developed at the output of the sensing bridge 1 is then fed, in the required polarity, to a biasing adjust potentiometer 5, that allows a control driver 4 to conduct at the rate needed for the associative control circuitry. A supply bridge (rectifier) 8 and supply resister 7 are connected between the supply AC power and a controlled device such as a control relay 6.

In operation, when the water level in a reservoir falls below the probes 2a, 2b, the current stops flowing through the sensing bridge 1 and shunt resister 3. A slight capacitive voltage Vc remains on the probe's cable, and that voltage is eliminated by the shunt resister 3 based on the time-constant of the RC network consisting of the cable capacitance and the value of the shunt resister 3. As Vc is reduced, the DC voltage to the control driver bias adjust input circuit decreases. The control driver 4 then changes state and powers the control circuitry. In water level control applications, the above control circuitry may in this condition enable increased water flow. In alternative configurations, the control circuitry controls operation of other application specific devices.

Consequently, when the fluid level is later again increased to be sufficient to cover the probes 2a, 2b, they supply current to the sensing rectifier bridge 1 so that the DC bias increases and cuts the control driver 4 off thus deactivating the control circuitry.

In FIG. 1, the geometric spacing between probes 2a, 2b is represented by the associated resistance Rd as determined by the fluid level conductivity and the desired sensitivity of the network.

An electrolytic capacitor 9 connected across the control driver 4 acts as an AC filter on the output of the control driver 4 and reduces chatter in the control relay 6.

Numerous alternative configurations of the invention may incorporate different biasing methods and additional components to allow for adjustment of the DC bias, and various control functions may be incorporated into the design; however, they are secondary to the main focus of the invention. For instance, the control driver 4 may be configured to activate a sump system to remove water or as an alarm rather than adding water as in the configuration discussed above.

A preferred embodiment of the invention uses the control circuitry to operate a fill relay when the water level drops below the probes that, in turn, activates a filling mechanism such as a standard 24vac irrigation valve that refills the reservoir.

The following components may be used to form one configuration of a preferred embodiment of the invention:

| Reference number | Description | Common Industry Indicator |
| --- | --- | --- |
| 1 | Sensing Bridge Rectifier | NTE-5332 |
| 2a,b | Sensing Probes | Level Waters 42-001-09-0132 |
| 3 | Sense Shunt Resister 2.7K Ohms | Vishay PR01000102701JR500 |
| 4 | Control Driver (Transistor) | ST 2N3055 |
| 5 | Driver Bias Adjust (Potentiometer) | Vishay 64W103 |
| 6 | Control Relay (24 vdc) | NTE R40-11D2-24 |
| 7 | Supply Feed Resistor, (1K Ohms) | Vishay PR01000101001JR500 |
| 8 | Supply Bridge Rectifier | NTE-5332 |
| 9 | Capacitor, Electrolytic 47 uf 35 v | Vishay 515D476M035AA6AE3 |

The reference numbers are those referred to above and illustrated in the figures. A common indicator of specific components readily available in the electronics market is provided in the last column.

FIG. 2 depicts a block level diagram of a preferred embodiment with reference to specific physical components. The following discussion refers to this illustration. All components are connected in accordance with the circuit illustrated in FIG. 1. The control relay 6 is a double pole double throw (DPDT) 24vdc relay which allows for switching of a fill mechanism on one set of relay contacts and ancillary circuitry such as, indicators or delay triggering, on the other contacts. The control driver 4 conducts when probes 2a, 2b are shorted, thus decreasing Rd thereby placing a ground on the supply side of control relay 6 keeping it deenergized. When the probes 2a, 2b are open (not submerged), Rd increases and control driver 4 stops conducting, thereby allowing supply voltage to activate the control relay 6. A 24vdc zener diode and 301 Ohm resister may be used to provide regulation for the VCC to the control driver 4 and supply voltage to control relay 6, however, they are not necessarily required for overall function.

The following factors and characteristics must be considered and satisfied for functionality of the invention in any particular configuration:

a. The supply bridge 8 and the sense bridge 1 must be similarly configured devices.

b. The control driver 4 must be capable of handling the current produced from VCC through supply feed resister 7.

c. The spacing between probes 2a, 2b must be small enough to provide a small Rd when shorted in water and wide enough to present a Rd in a megohms range when not in contact with the water.

d. The shunt resistor 3 must provide for a balance between a short RC time constant with the probe cable and an impedance high enough to develop sufficient bias voltage to the control driver.

e. The supply bridge 8 negative lead must remain isolated from sensor bridge 1 negative lead.

f. All components must be rated to the supply voltage and their associated load.

g. The bias adjust 5 must have a resistance value such that the voltage drop across it reduces the bias voltage from sense bridge 1 to within the optimal cut-on and cut-off voltage of the control driver 4 component.

The preceding discussion is provided for example only. Other variations of the claimed inventive concepts will be obvious to those skilled in the art. Adaptation or incorporation of known alternative devices and materials, present and future is also contemplated. For example, the above configurations may be embodied in a portable water detection device or may be incorporated into a fixed facility. The intended scope of the invention is defined by the following claims.

The invention claimed is:

1. A device for controlling a DC device by sensing water comprising:

a pair of conducting probes, the probes spatially retained with an intervening gap, the probes and gap configured to allow conduction of electricity between the probes when a voltage is applied across the probes and the gap is filled with a conducting fluid;

a control driver;

a rectifying control means for detecting a current passing between the probes and providing a direct current electrical control signal to the control driver;

supply means for accepting AC electrical power and supplying DC electrical power to the control driver;

wherein the control driver has a first condition when receiving a control signal from the rectifying control means, and a second condition when no control signal is received from the rectifying control means; and such that when the supply means is accepting AC power, and the probe gap is filled with a conducting fluid, the control driver does not deliver DC power to a control circuit in the first condition, and when the probe gap is not filled with a conducting fluid the control driver delivers power to the control circuit in the second condition.

2. A device, according to claim 1, and wherein:

the rectifying means comprises a bridge rectifier.

3. A device, according to claim 2, and further comprising:

the control circuit comprises a relay.

4. A device, according to claim 2, and wherein:

the rectifying means includes a shunt resister configured to connect the two input poles of the bridge rectifier.

* * * * *